United States Patent
Alonso-Vante et al.

(10) Patent No.: US 7,588,857 B2
(45) Date of Patent: *Sep. 15, 2009

(54) CHALCOGEN CATALYSTS FOR POLYMER ELECTROLYTE FUEL CELL

(75) Inventors: Nicolas Alonso-Vante, Buxerolles (FR); Piotr Zelenay, Los Alamos, NM (US); Jong-Ho Choi, Los Alamos, NM (US); Andrzej Wieckowski, Champaign, IL (US); Dianxue Cao, Urbana, IL (US)

(73) Assignee: Los Alamos National Security, LLC, Los Alamos, NM (US)

( * ) Notice: Subject to any disclaimer, the term of this patent is extended or adjusted under 35 U.S.C. 154(b) by 449 days.

This patent is subject to a terminal disclaimer.

(21) Appl. No.: 11/295,361

(22) Filed: Dec. 5, 2005

(65) Prior Publication Data

US 2007/0128501 A1    Jun. 7, 2007

(51) Int. Cl.
*H01M 4/00* (2006.01)
(52) U.S. Cl. .......................... 429/44; 429/42
(58) Field of Classification Search ............... 429/42, 429/44, 30; 502/101
See application file for complete search history.

(56) References Cited

U.S. PATENT DOCUMENTS 4,615,959 A * 10/1986 Hayashi et al. ............. 429/336
6,696,382 B1   2/2004 Zelenay et al.
7,125,820 B2 * 10/2006 Campbell ................... 502/104
2003/0175578 A1   9/2003 Kim
2006/0105210 A1 *  5/2006 Surampudi et al. ............ 429/22

FOREIGN PATENT DOCUMENTS

KR   1020050115918   * 11/2005

OTHER PUBLICATIONS

Zhang et al., "Progress In Preparation Of Non-Noble Electrocatalysts For PEM Fuel Cell Reactions," Journal Of Power Sources, xxx (2005) xxx-xxx.
Malakhov et al., "In Situ EXAFS Study to Probe Active Centers of Ru Chalcogenide Electrocatalysts During Oxygen Reductin Reaction," J. Phys. Chem. B 2002, 106, 1670-1676.
Solorza-Feria et al., "Novel Low-Temperature Synthesis of Semiconducting Transition Metal Chalcogenide electrocatalys for Multielectron Charge Transfer: Molecular oxygen Reduction," Electrochimica Acta, vol. 39, No. 11/12, pp. 1647-1653, 1994.
Alonso-Vante et al., "The Structure Analysis of the Active Centers of Ru-Containing electrocatalysts for the Oxygen Reduction. An In Situ EXAFS Study," Electrochimica Acta 47 (2002) 3807-3814.
Campbell, "Non-Noble metal Catalysts for the Oxygen Reduction Reaction," Pub. No., US 2004/0096728 A1, Pub. Date, May 20, 2004.

* cited by examiner

*Primary Examiner*—Patrick Ryam
*Assistant Examiner*—Thomas H. Parsons
(74) *Attorney, Agent, or Firm*—Robert P. Santandrea; Juliet A. Jones (57) ABSTRACT

A methanol-tolerant cathode catalyst and a membrane electrode assembly for fuel cells that includes such a cathode catalyst. The cathode catalyst includes a support having at least one transition metal in elemental form and a chalcogen disposed on the support. Methods of making the cathode catalyst and membrane electrode assembly are also described.

12 Claims, 10 Drawing Sheets

100
CHALCOGEN CATALYSTS FOR POLYMER ELECTROLYTE FUEL CELL

STATEMENT REGARDING FEDERAL RIGHTS

This invention was made with government support under Contract No. W-7405-ENG-36, awarded by the U.S. Department of Energy. The government has certain rights in the invention.

BACKGROUND OF INVENTION

The invention relates to fuel cells. More particularly, the invention relates to fuel cell electrodes. Even more particularly, the invention relates to cathode materials for fuel cell electrodes.

Polymer electrolyte fuel cells (PEFCs) based on direct methanol fuel cells (DMFCs) have attracted great interest as an alternative power source for vehicles and portable electronic devices. Factors that significantly reduce the efficiency of DMFCs include sluggish methanol oxidation at the anode, sluggish oxygen reduction reaction (ORR) at the cathode, and methanol crossover. The sluggish methanol oxidation and ORR cause a large overpotential at the anode and the cathode, respectively, thus dramatically reducing cell voltage. Methanol crossover is the permeation of methanol through the solid electrolyte membrane from the anode to the cathode, where it is oxidized. The simultaneous ORR and oxidation of methanol at the cathode lead to an additional reduction of the cathode potential and decrease in DMFC performance.

Platinum and platinum-based metal alloys are, at present, the most widely used ORR catalysts in DMFCs. However, these catalysts suffer significant loss in activity in the presence of methanol due to poisoning by methanol. Efforts have been made to develop alternative ORR catalysts other than platinum that are either inactive or sufficiently tolerant to methanol. Nano-cluster $Mo_xRu_ySe_z$ and $Ru_xSe_y$ compounds, for example, have been prepared from ruthenium carbonyl precursors.

The development of highly active, methanol tolerant cathode catalysts for ORR is one of the most important considerations in achieving high efficiency DMFCs. Therefore, what is needed is a fuel cell catalyst having adequate tolerance to methanol. What is also needed is a method of making such electrode catalysts.

SUMMARY OF INVENTION

The present invention meets these and other needs by providing a methanol-tolerant cathode catalyst and a membrane electrode assembly for fuel cells that includes such a cathode catalyst. The cathode catalyst comprises a support that includes at least one transition metal in elemental form and a chalcogen disposed on the support. Methods of making the cathode catalyst and membrane electrode assembly are also described.

Accordingly, one aspect of the invention is to provide a membrane electrode assembly. The membrane electrode assembly comprises: an ionomeric membrane; an anode disposed on a first surface of the ionomeric membrane; and a cathode catalyst disposed on a second surface of the ionomeric membrane. The cathode catalyst includes: a support comprising at least one reactive transition metal in elemental form, wherein the at least one transition metal is capable of reducing oxygen; at least one chalcogen in elemental form disposed on at least a portion of a surface of the support; and a recast ionomer dispersed throughout the heteroatomic-carbon composite.

A second aspect of the invention is to provide a cathode catalyst for a polymer electrolyte fuel cell. The cathode catalyst comprises: a support comprising at least one transition metal in elemental form, wherein the at least one transition metal is capable of reducing oxygen; at least one chalcogen in elemental form disposed on at least a portion of a surface of the support, wherein the at least one chalcogen is selected from the group consisting of sulfur, selenium, and tellurium; and a recast ionomer dispersed throughout the heteroatomic-carbon composite.

A third aspect of the invention is to provide a membrane electrode assembly for a fuel cell, the membrane electrode assembly comprising: an ionomeric membrane; an anode disposed on a first surface of the ionomeric membrane; and a cathode catalyst disposed on a second surface of the ionomeric membrane. The cathode catalyst comprises: a support comprising at least one transition metal in elemental form, wherein the at least one transition metal is capable of reducing oxygen and is selected from the group consisting of ruthenium, osmium, rhenium, rhodium, and combinations thereof; at least one chalcogen in elemental form disposed on at least a portion of a surface of the support, wherein the at least one chalcogen is selected from the group consisting of sulfur, selenium, and tellurium; and a recast ionomer dispersed throughout the heteroatomic-carbon composite.

A fourth aspect of the invention is to provide a method of making a cathode catalyst. The cathode catalyst includes a support comprising at least one transition metal and at least one chalcogen in elemental form disposed on at least a portion of a surface of the support. The method comprises the steps of: providing the at least one transition metal in powder form; reducing the at least one transition metal; providing a suspension of the at least one chalcogen in an organic solvent; combining the at least one transition metal with the suspension; refluxing the at least one transition metal and the suspension to form cathode catalyst solid particles, the solid particles comprising the at least one transition metal and the at least one chalcogen; and collecting the cathode catalyst solid particles.

A fifth aspect of the invention is to provide a method of making a membrane electrode assembly. The membrane assembly comprises an ionomeric membrane, an anode catalyst disposed on a first surface of the ionomeric membrane, and a cathode catalyst disposed on a second surface of the ionomeric membrane. The method comprises the steps of: providing at least one transition metal in elemental form; reducing the at least one transition metal; providing a suspension of at least one chalcogen in an organic solvent; combining the at least one transition metal with the suspension; refluxing the at least one transition metal and the suspension to form cathode catalyst solid particles, the solid particles comprising the at least one transition metal and the at least one chalcogen; collecting the cathode catalyst solid particles; applying the cathode catalyst to the second surface of the ionomeric membrane; and applying the anode catalyst to the first surface of the ionomeric membrane to form the membrane electrode assembly.

A sixth aspect of the invention is to provide a cathode catalyst for a polymer electrolyte fuel cell. The cathode catalyst comprises: a support comprising a transition metal in elemental form capable of reducing oxygen, wherein the at least one transition metal is selected from the group consisting of ruthenium, osmium, rhenium, rhodium, and combinations thereof; at least one chalcogen in elemental form disposed on at least a portion of a surface of the support, wherein the at least one chalcogen is selected from the group consisting of sulfur, selenium, and tellurium; a recast ionomer dispersed throughout the support. The at least one chalcogen is formed by: providing a suspension of the at least one chalcogen in an organic solvent; combining the at least one transition metal with the suspension; refluxing the at least one transition metal and the suspension to form cathode catalyst solid particles, the solid particles comprising the at least one transition metal and the at least one chalcogen; and collecting the cathode catalyst solid particles.

These and other aspects, advantages, and salient features of the present invention will become apparent from the following detailed description, the accompanying drawings, and the appended claims.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

The present invention provides a cathode catalyst comprising a metal support that includes at least one transition metal and at least one chalcogen, both in elemental form. The catalyst is intended for use as a cathode electrocatalyst in fuel cells, including polymer electrolyte fuel cells (also referred to herein as "PEFCs"), hydrogen-oxygen fuel cells, hydrogen-air fuel cells, and direct methanol fuel cells (also referred to herein as "DMFCs"). The invention also provides a membrane electrode assembly (also referred to herein as "MEA") for such fuel cells.

Figure 1:
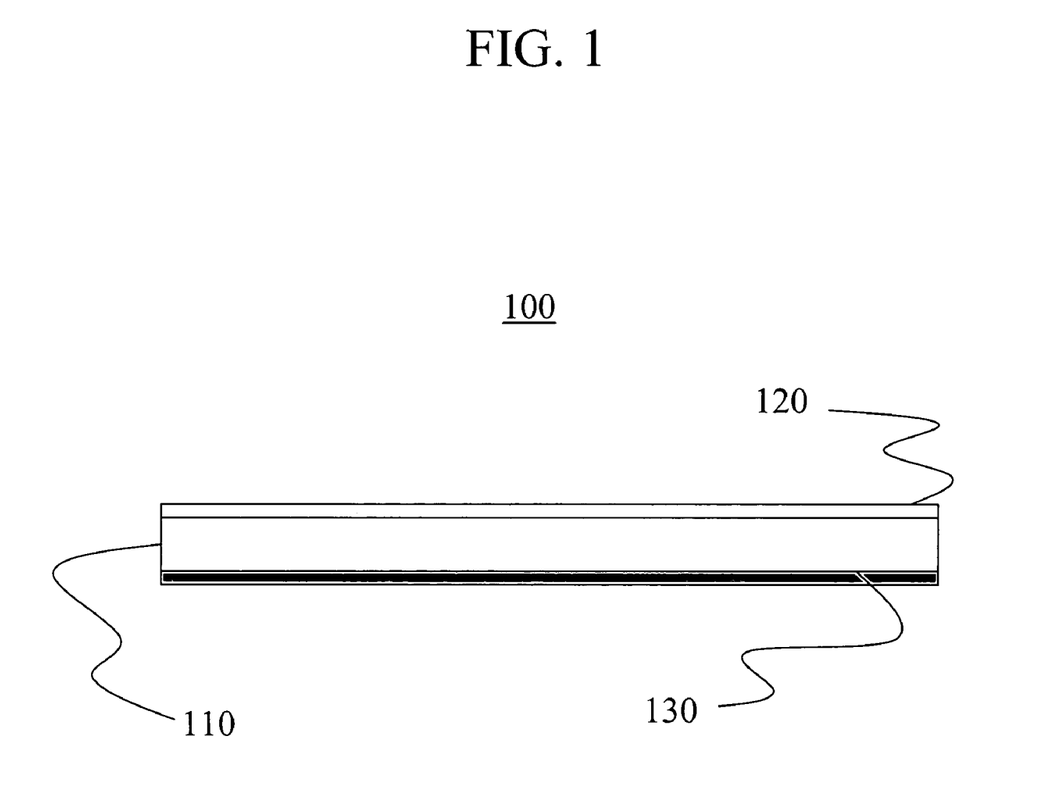
FIG. 1 is a schematic cross-sectional representation of a membrane electrode assembly of the present invention.

Referring to the drawings in general and to FIG. 1 in particular, it will be understood that the illustrations are for the purpose of describing a particular embodiment of the invention and are not intended to limit the invention thereto. FIG. 1 is a schematic cross-sectional representation of an MEA of the present invention. MEA 100 comprises an ionomeric membrane 110, a cathode catalyst composite 120 disposed on a first surface of ionomeric membrane 110, and an anode catalyst 130 disposed on a second surface of ionomeric membrane 110.

In one embodiment, ionomeric membrane 110 is a poly (perfluorosulphonic acid) membrane which is commercially available as Nafion® 117, Aciplex®, or Flemion®. Other ionomeric membrane materials known in the art, such as sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ether ketone) and poly(arylene ether sulfone); polybenzimidazole; polyphosphazene, such as poly [(3-methylphenooxy) (phenoxy) phosphazene] and poly [bis (3-methylphenoxy) phosphazene]; derivatives thereof; and combinations thereof may also be used. Anode catalyst 130 comprises at least one metal. The at least one metal is selected from those metals, such as, but not limited to, platinum, ruthenium, palladium, and combinations thereof, that are known and used in the art as fuel cell anode materials. Anode catalyst 130 is typically deposited on ionomeric membrane 110 by preparing an ink containing the at least one metal and applying the ink to a first surface of ionomeric membrane 110. In one embodiment, anode catalyst 130 comprises a mixture of platinum and ruthenium, such as, for example, platinum-ruthenium black.

Figure 2:
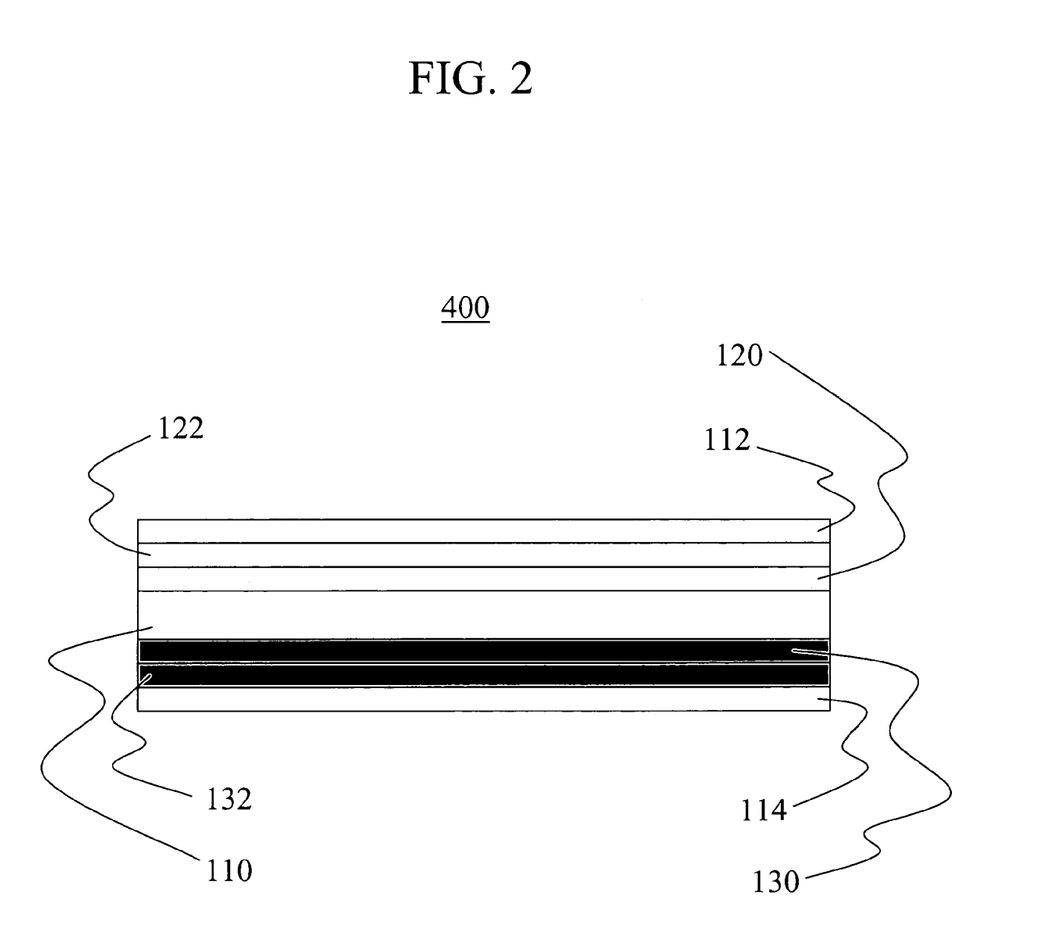
FIG. 2 is a schematic cross-sectional representation of a second embodiment of the membrane electrode assembly.

In another embodiment, shown in FIG. 2, a portion of anode catalyst 132 is additionally deposited on a surface of a first gas diffusion layer or "backing" 114 facing anode catalyst 130, disposed on ionomeric membrane 110. Alternatively, all of the anode catalyst may be deposited on first gas diffusion layer 114. First gas diffusion layer 114 is then joined to membrane electrode assembly 400 by placing the portion of anode catalyst 132 in contact with anode catalyst 130, which has been deposited on the first surface of ionomeric membrane 110, by, for example, compression or hot-pressing. Similarly, a portion of cathode catalyst 122 may be deposited on a surface of a second gas diffusion layer 112 facing cathode catalyst 120, disposed on jonomeric membrane 110. Second gas diffusion layer 112 is then joined to membrane electrode assembly 400 by placing the portion of cathode catalyst 122 in contact with cathode catalyst 120, which has been deposited on the first surface of ionomeric membrane 110, by, for example, compression or hot-pressing. As with the anode catalyst, all of the cathode catalyst may, in one embodiment, be applied to second gas diffusion layer 112. First and second gas diffusion layers 112, 114 may comprise carbon cloth, carbon paper, or other such material that are known in the art.

Cathode catalyst 120 includes a support that comprises at least one transition metal in elemental form capable of reducing oxygen, at least one chalcogen in solid elemental form, and a recast ionomer. The at least one transition metal is present in the form of nanoparticles and is selected from the group consisting of ruthenium, osmium, rhenium, rhodium, platinum, palladium, cobalt, nickel, chromium, molybdenum, iron, manganese, vanadium, tungsten, and combinations thereof. The at least one chalcogen is disposed on at least a portion of a surface of the support, and is selected from the group consisting of sulfur, selenium, and tellurium. In one embodiment, the at least one chalcogen forms between about 0.1 monolayer and about 2 monolayers on the surface of the support. The at least one chalcogen serves to modify the surface of the at least one transition metal, thereby suppressing the oxidation of the at least one transition metal. The recast ionomer assures ionic conductivity within the catalyst, and is selected from the group consisting of poly(perflourosulphonic acid), sulfonated styrene-ethylene-butylene-styrene, polystyrene-graft-poly(styrene sulfonic acid), poly(vinylidene fluoride)-graft-poly(styrene sulfonic acid), poly (arylene ether), polyphosphazene, and combinations thereof. In a preferred embodiment, the recast ionomer is poly(perflourosulphonic acid).

Figure 5:
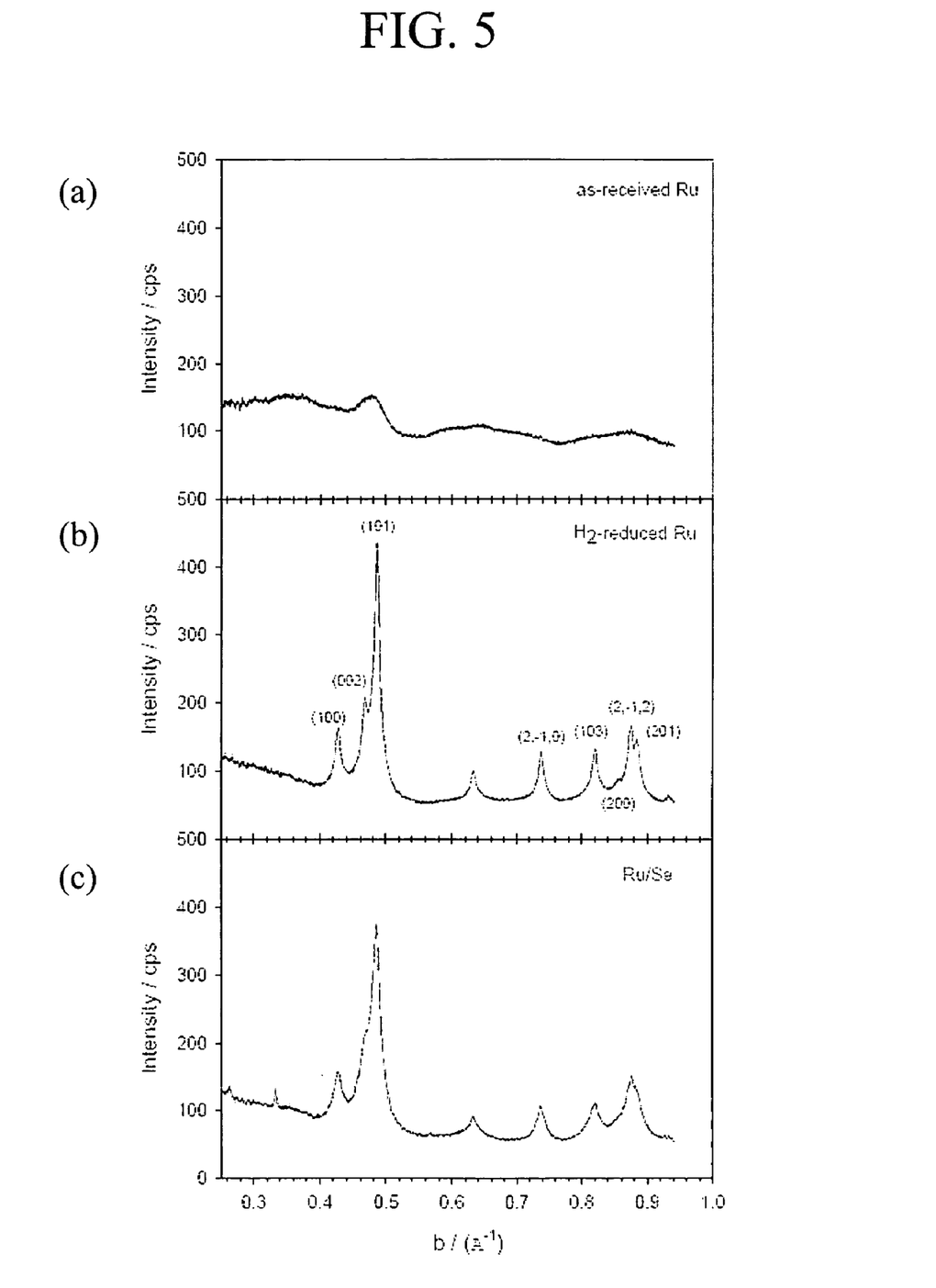
FIG. 5 includes x-ray diffraction data for: a) as received elemental ruthenium powder; b) elemental ruthenium powder after reduction in hydrogen; and c) elemental ruthenium powder after refluxing with selenium in xylene.

Cathode catalyst 120 of the present invention differs from known nano-cluster compounds such as $Mo_xRu_ySe_z$ and $Ru_{x^-}Se_y$. Such nano-cluster compounds comprise a metal atom core or "center" around which chalcogen atoms are coordinated so as to form a chemical compound, thereby stabilizing the metal atom center. In contrast to such nano-cluster compounds, cathode catalyst 120 comprises a "support" of a transition metal in elemental form, the surface of which is modified by the chalcogen. While some compound formation may occur at the surface of the transition metal, no chemical compound is formed between the chalcogen and the bulk of the transition metal. X-ray diffraction (XRD) data obtained for the Ru/Se particles at different stages of preparation, shown in FIG. 5, demonstrates that ruthenium and selenium do not combine in the bulk to form a discrete compound. As-received ruthenium black (FIG. 5(a)) comprises ruthenium oxides and a small amount of metallic ruthenium. Elemental ruthenium is recovered by reducing the oxidized sample in hydrogen (FIG. 5(b)). The XRD pattern obtained after refluxing the ruthenium powder with selenium in xylene is shown in FIG. 5(c). Aside from changes in peak intensity and peak widths, the basic diffraction pattern seen in FIG. 5(c) is the same as that shown in FIG. 5(b), indicating that the bulk ruthenium remains in elemental form after refluxing with selenium.

The presence of the chalcogen serves to modify the properties of the transition metal surface. The effect of the chalcogen upon the surface of the transition metal is illustrated by cyclic voltammetry (CV) results, shown in FIG. 10, that were obtained for selenium- and sulfur-modified ruthenium nanoparticle surfaces.

Figure 10:
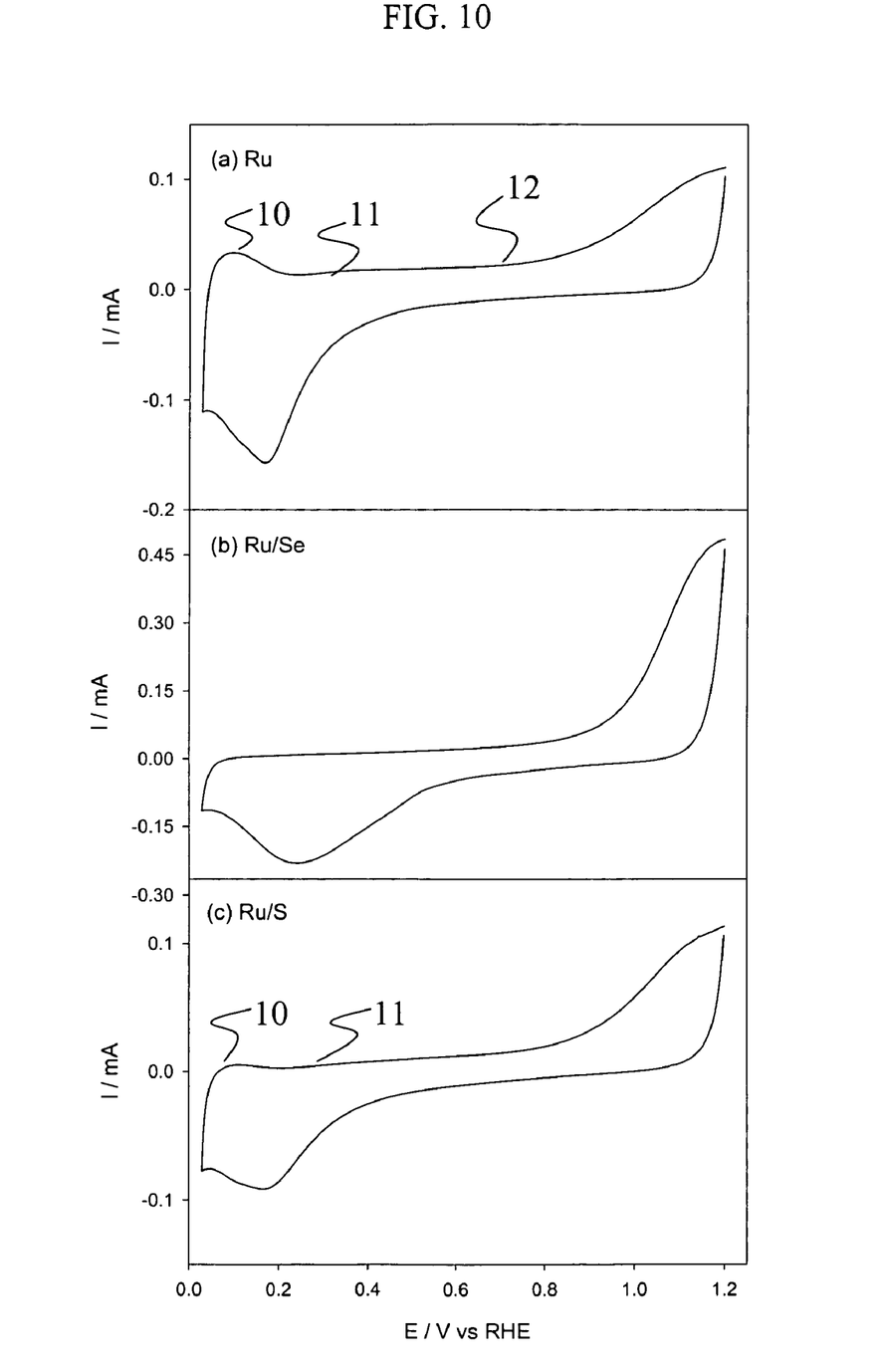
FIG. 10 is a plot of cyclic voltametry data for: a) ruthenium black nanoparticles; b) ruthenium black nanoparticles treated with selenium; and c) ruthenium black nanoparticles treated with sulfur.

FIG. 10(a) shows CV data obtained for ruthenium nanoparticles on a gold substrate obtained in 0.1 M $H_2SO_4$ at a scan rate of 20 $mVs^{-1}$. The anodic peak 10 at 0.1 V is attributed to the hydrogen desorption from the ruthenium surface. As seen in FIGS. 10(b) and 10(c), the hydrogen desorption peak 10 is suppressed when either selenium (FIG. 10(b)) or sulfur (FIG. 10(c)) is present on the ruthenium surface, indicating that surface of the ruthenium nanoparticles is modified by both chalcogens. Hydrogen desorption is completely suppressed by the presence of selenium (FIG. 10(b)), whereas the presence of sulfur only partially suppresses hydrogen desorption.

A small, broad anodic current 11 due to the adsorption of water-related species, such as hydroxyl species, begins to appear at about 0.3 V in FIG. 10(a). The presence of selenium on the surface of the ruthenium nanoparticles suppresses the adsorption of water-related species (FIG. 10(b)), whereas such adsorption is not suppressed by the presence of sulfur (FIG. 10(c)). The anodic current observed for the ruthenium black (12 in FIG. 10(a)) becomes significant at 0.7 V, due to surface oxide formation 12. The oxidation of ruthenium metal is completely hindered by the presence of selenium, as shown in FIG. 10(b). The increase in oxidation current at 0.82 V in FIG. 10(b) corresponds to the oxidation of the selenium overlayers, whereas the steep current seen in FIG. 10(c) at about 0.75 V is due to the oxidation of both sulfur and ruthenium, with a partial dissolution of sulfur oxides.

Figure 3:
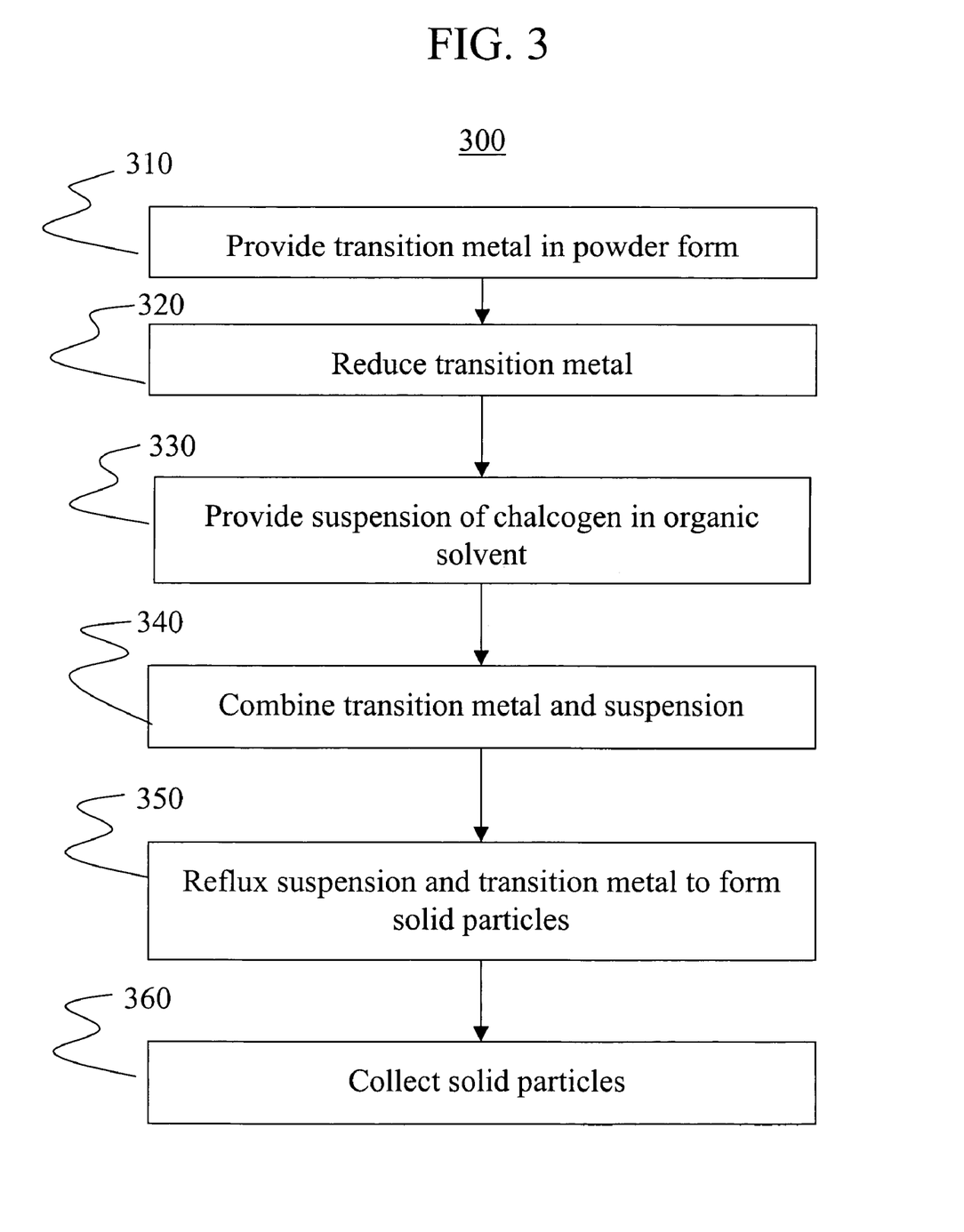
FIG. 3 is a flow chart for a method of making a cathode catalyst.

The invention also provides a method of making a cathode catalyst material comprising a support that comprises at least one transition metal in elemental form and at least one chalcogen in solid elemental form disposed on the support, as described hereinabove. The method is outlined in the flow chart shown in FIG. 3. In Step 310, the at least one transition metal is provided in powder form. In one non-limiting example, ruthenium black may be provided. In one embodiment, the powder comprises nanoparticles having an average particle size of up to about 15 nm. In a particular embodiment, the powder has an average particle size in a range from about 10 to about 15 nm. Oxide is removed from the transition metal powder by heating the metal powder in a hydrogen-containing atmosphere (Step 320). A suspension of the chalcogen in an organic solvent such as, but not limited to, xylene, 1,2-dichlorobenzene, toluene, mesitylene, and the like is provided in Step 330. The transition metal and the suspension are combined (Step 340), heated to the boiling point of the solvent, and refluxed for a predetermined time period (Step 350), during which time solid particles comprising the transition metal and the chalcogen are formed. The solid particles are then collected (Step 360) and dried. The solid particles may then be combined with a recast ionomer, such as those described hereinabove, to form a cathode catalyst ink for application to ionomeric membrane 110.

Figure 4:
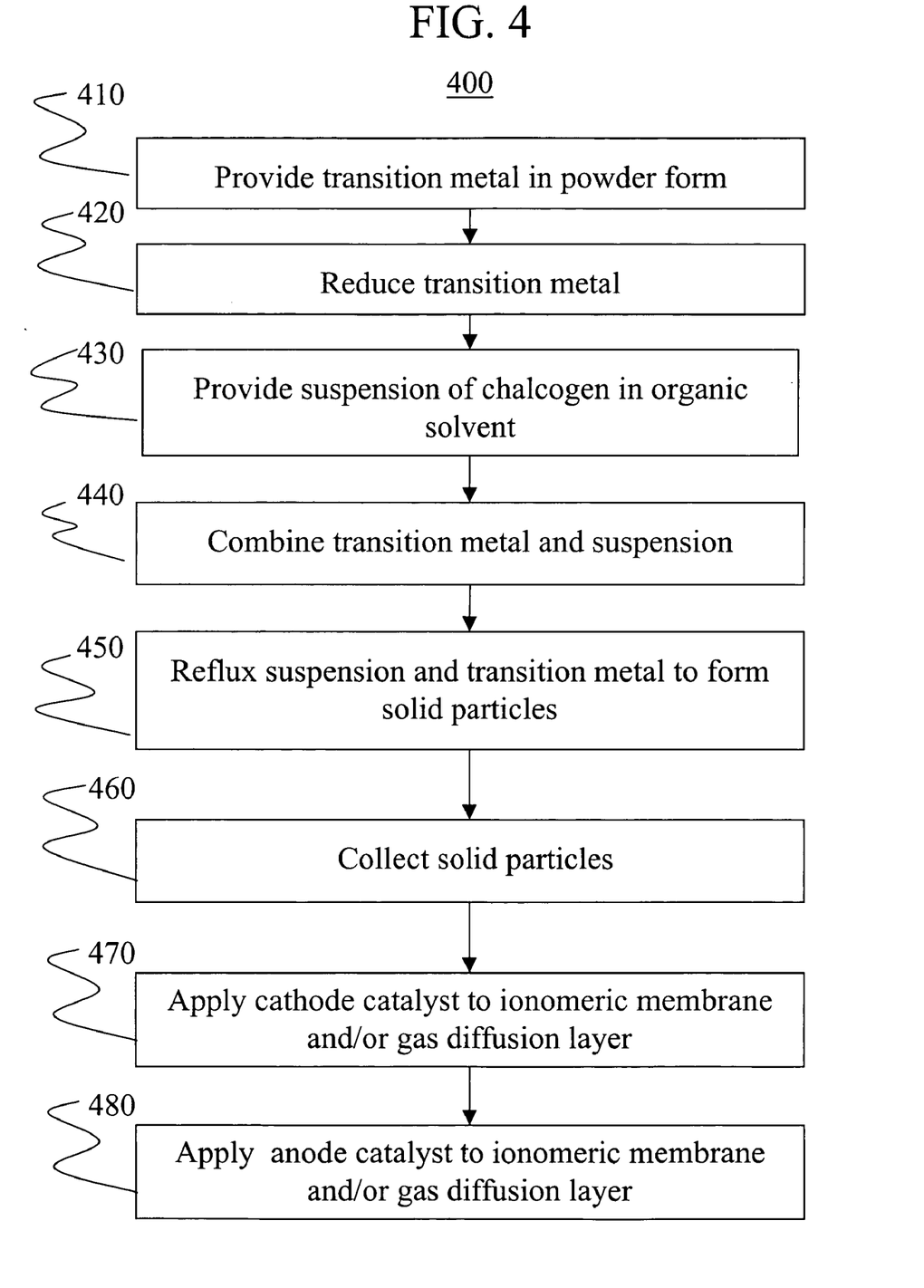
FIG. 4 is a flow chart for a method of making a membrane electrode assembly.

A method, outlined in the flow chart shown in FIG. 4, of making membrane electrode assembly 100 is also provided. In step 410, the at least one transition metal is provided in elemental form as a powder. In one non-limiting example, ruthenium black is provided. In one embodiment, the powder comprises nanoparticles having an average particle size of up to about 15 nm. In a particular embodiment, the powder has an average particle size in a range from about 10 to about 15 nm. Oxide is removed from the transition metal in elemental form powder by heating the metal powder in a hydrogen-containing atmosphere (Step 420). A suspension of the chalcogen in an organic solvent, such as, but not limited to, xylene, 1,2-dichlorobenzene, toluene, mesitylene, and the like is provided in Step 430. The transition metal and the suspension are combined (Step 440), heated to the boiling point of the solvent, and refluxed for a predetermined time period (Step 450), during which time solid particles comprising the transition metal and the chalcogen in elemental form are formed. The cathode catalyst, comprising the solid particles, are then collected (Step 460) and dried. In one embodiment, the transition metal/chalcogen solid particles are combined with the recast ionomer to form a cathode catalyst ink. The details of Steps 410-460 are identical to those described for Steps 310-360, described hereinabove. The solid particles may then be combined with a recast ionomer, such as those described hereinabove, to form a cathode catalyst ink for application to ionomeric membrane 110. The anode catalyst is combined with the recast ionomer to form an anode catalyst ink. The cathode catalyst ink containing the cathode catalyst is then applied to a surface of ionomeric membrane 110 in Step 470, and the anode catalyst ink containing anode catalyst 130 is applied to another surface of ionomeric membrane 110 in Step 480 to form MEA 100. In another embodiment, a portion of the anode catalyst ink is also applied to a surface of a first gas diffusion layer 114, and the first gas diffusion layer 114 is then placed in contact with a portion of anode catalyst ink that has been deposited on the first surface of ionomeric membrane 110. Similarly, a portion of the cathode catalyst ink may be applied to a surface of a second gas diffusion layer 112, which in turn contacts a portion of cathode catalyst ink that has been applied the second surface of ionomeric membrane 110. The anode catalyst and cathode catalyst inks may be applied to ionomeric membrane 110 or, alternatively, to gas diffusion layers 112, 114, using techniques such as, but not limited to, brush painting, doctor-blading, ultrasonic spraying, air spraying, screen-printing, decal transfer, and the like.

The following examples illustrate the various features and advantages of the invention and are not intended to limit the invention thereto. While the examples refer to a cathode catalyst and MEA comprising ruthenium and selenium, it is understood that these materials represent a preferred embodiment of the invention, and that other metals and chalcogens described herein may also be used.

EXAMPLE 1

Preparation of Ru/Se Cathode Catalyst

As-received ruthenium black (Alfa Aesar, 99.9%) was reduced at 230±10° C. for 1 hour under hydrogen (ultra high purity (UHP)) flow and then cooled down to the room temperature in hydrogen, which was then replaced by argon (UHP). A suspension of selenium powder in xylene was prepared using selenium powder (Alfa Aesar, ~200 mesh, as-received) and xylene (Fisher Scientific, certified ACS), which was dried using molecular sieves (4A, Aldrich) for one week prior to use. The suspension was pre-purged with argon for 30 minutes and then injected into a flask containing the reduced ruthenium black. The mixture was heated up to the solvent boiling point (~140° C.) and kept under reflux for 24 hours while maintaining a slow flow of argon through the suspension. After the reaction took place, the solid particles were separated from the solvent by centrifugation, and then washed with anhydrous ethyl ether (Fisher Scientific, certified ACS) six times before being finally dried under vacuum for 2 hours.

X-ray diffraction (XRD) data obtained for the Ru/Se particles at different stages of preparation are shown in FIG. 5. As-received ruthenium black ((a) in FIG. 5) reveals the presence of ruthenium oxides and a small amount of metallic ruthenium. Elemental ruthenium is recovered by reducing the oxidized sample in hydrogen ((b) in FIG. 5). The XRD pattern also indicates that the Ru particle size is on the order of about 11.6 nm. The XRD pattern obtained after refluxing the ruthenium powder with selenium in xylene, shown in (c) of FIG. 5, indicates that the particle size of the Ru/Se material is about 30% less than that of the initial reduced elemental ruthenium precursor without ruthenium material loss, indicating that selenium had interacted with the ruthenium powder to reduce the particle size of the powder.

EXAMPLE 2

Reactivity Test of Ru/Se Powder

Figure 6:
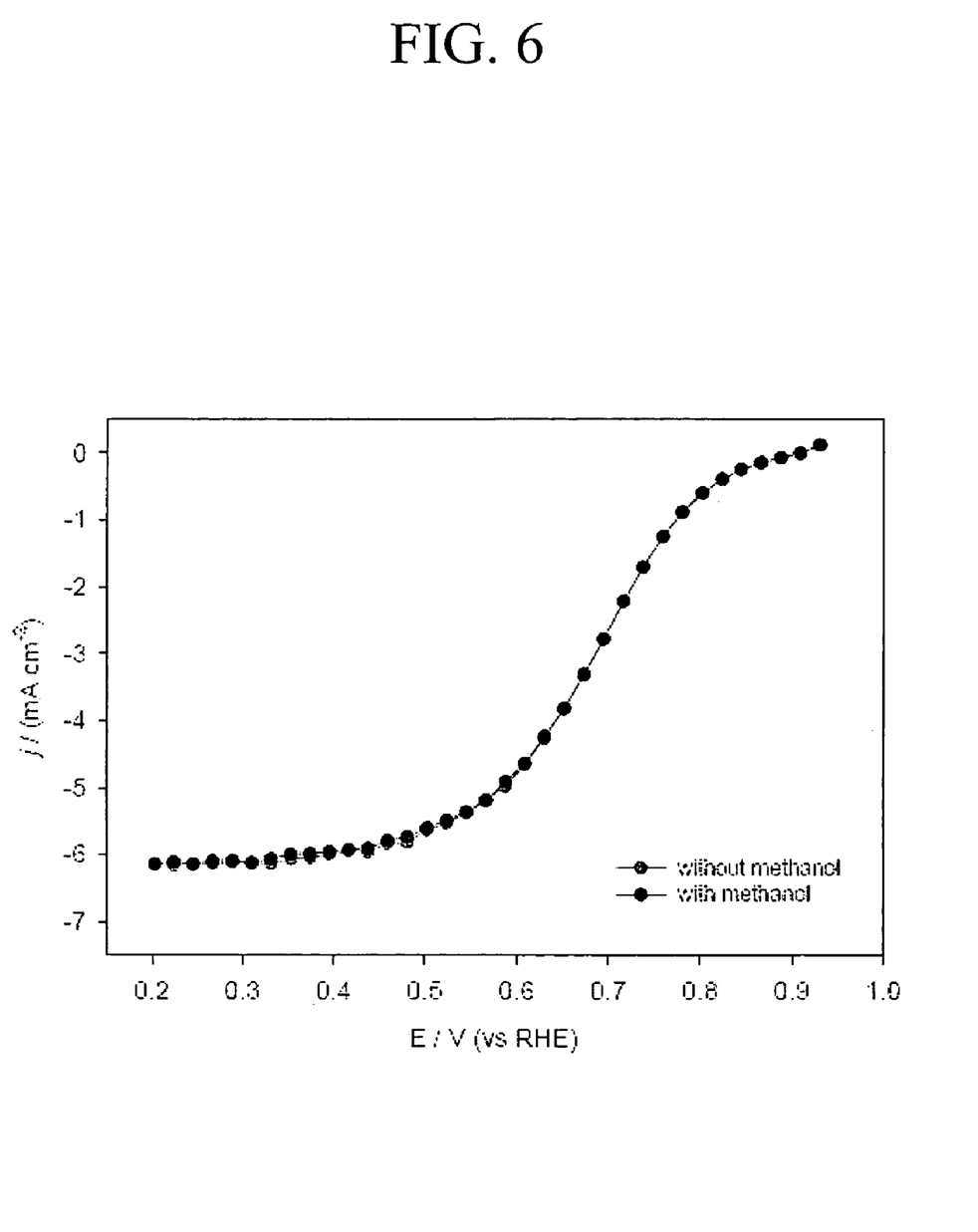
FIG. 6 is a plot of current density-potential curves for oxygen reduction at a ruthenium/selenium (Ru/Se) electrode with and without methanol present.

The Ru/Se material prepared in Example 1 was tested as an oxygen reduction catalyst in the fuel cell cathode. The Ru/Se powder was immobilized on a gold rotating disc electrode (RDE) having a 3 mm diameter. The Ru/Se loading on the disc electrode was about 150 μg/cm$^2$. Measurements were carried out using a RDE in O$_2$-saturated 0.1 M H$_2$SO$_4$, both with and without 0.1 M CH$_3$OH. The RDE had a rotating speed of 1600 rpm, and a voltametric scan rate of 20 mV/s at ambient temperature. FIG. 6 shows current density-potential curves, obtained with and without methanol, for the oxygen reduction reaction. The Ru/Se cathode catalyst exhibits high oxygen reduction activity. Compared to an ordinary platinum black cathode catalyst, the presence of methanol had no effect on Ru/Se catalyst activity.

EXAMPLE 3

Preparation of Cathode Catalyst Electrode

Cathode catalyst ink was prepared by thoroughly blending the Ru/Se composite powder prepared in Example 1 with water and recast Nafion® ionomer. The required amount of cathode catalyst powder was combined with de-ionized water to achieve a 1:10 ratio by weight. An appropriate quantity of 5% Nafion® solution (1100 equivalent weight, Solution Technology, Inc.) needed to obtain a 1:1 volume ratio of the catalyst to Nafion® in the cathode catalyst layer 120 was added to the water-wetted catalyst. The solution was placed in an ice bath to prevent overheating and minimize evaporation of solvents and ultrasonically mixed for 90 seconds.

EXAMPLE 4

Preparation of Anode Catalyst Electrode

The procedure for making anode catalyst ink was similar to that used for the cathode catalyst ink. The anode catalyst was a Pt/Ru black powder (Johnson Matthey). The Pt/Ru catalyst was combined with de-ionized water to obtain a 1:10 ratio by weight. An appropriate quantity of 5% Nafion® solution (1100 equivalent weight, Solution Technology, Inc.) was added to the water-wetted catalyst to obtain a 1:1 volume ratio of the catalyst to Nafion® in the anode catalyst layer 130. The solution was placed in an ice bath to prevent overheating and minimize evaporation of solvents and ultrasonically mixed for 90 seconds.

EXAMPLE 5

Preparation of Membrane Electrode Assembly

The anode catalyst and cathode catalyst inks prepared in Examples 3 and 4 were applied to an ionomeric membrane using brush painting. Other application methods, such as, but not limited to, doctor-blading, ultrasonic spraying, air spraying, decal transfer, screen-printing, and the like may also be used. While the ionomeric membrane Nafion® 117 was used in this example, other membranes and gas diffusion media may be used as well. A piece of an ionomeric membrane was placed on the top of a vacuum table that had been preheated to 75° C. The vacuum table was used to hold the membrane in place and avoid wrinkling while painting. Either of the anode ink or cathode ink was then applied to one side of the membrane using a camel hair brush. After the painting of the first electrode had been completed, the membrane was turned over and the electrode was painted on the other side. The vials containing the anode and cathode inks were cooled in an ice bath during painting and capped whenever possible to minimize evaporation of solvents. Upon completion of painting, the MEA was left on the heated vacuum table for an additional 30 minutes to allow the anode and cathode catalyst layers to cure. The MEA was then removed from the table and placed in a sealed plastic bag for future use. The anode and cathode catalyst loadings were approximately 8.0 mg/cm$^2$ Pt—Ru and 5.0 mg/cm$^2$ Ru/Se, respectively.

The MEA was then assembled in standard 5 cm² fuel cell hardware. Hydrophobic double-sided and single-sided carbon-cloth gas diffusion layers (backings) from De Nora USA (E-TEK, Inc.) were used on the cathode and the anode sides of the cell, respectively.

EXAMPLE 6

Hydrogen-Air Fuel Cell Performance

The performance of the MEAs and cathode catalysts described in the preceding examples was tested in hydrogen-air fuel cells. Performance was tested at 30° C., 50° C., 70° C., and 80° C. The flow rates of hydrogen and air were 300 sccm and 466 sccm, respectively. The gases were humidified at a temperature that was 10° C. greater than the cell operating temperature.

Figure 7:
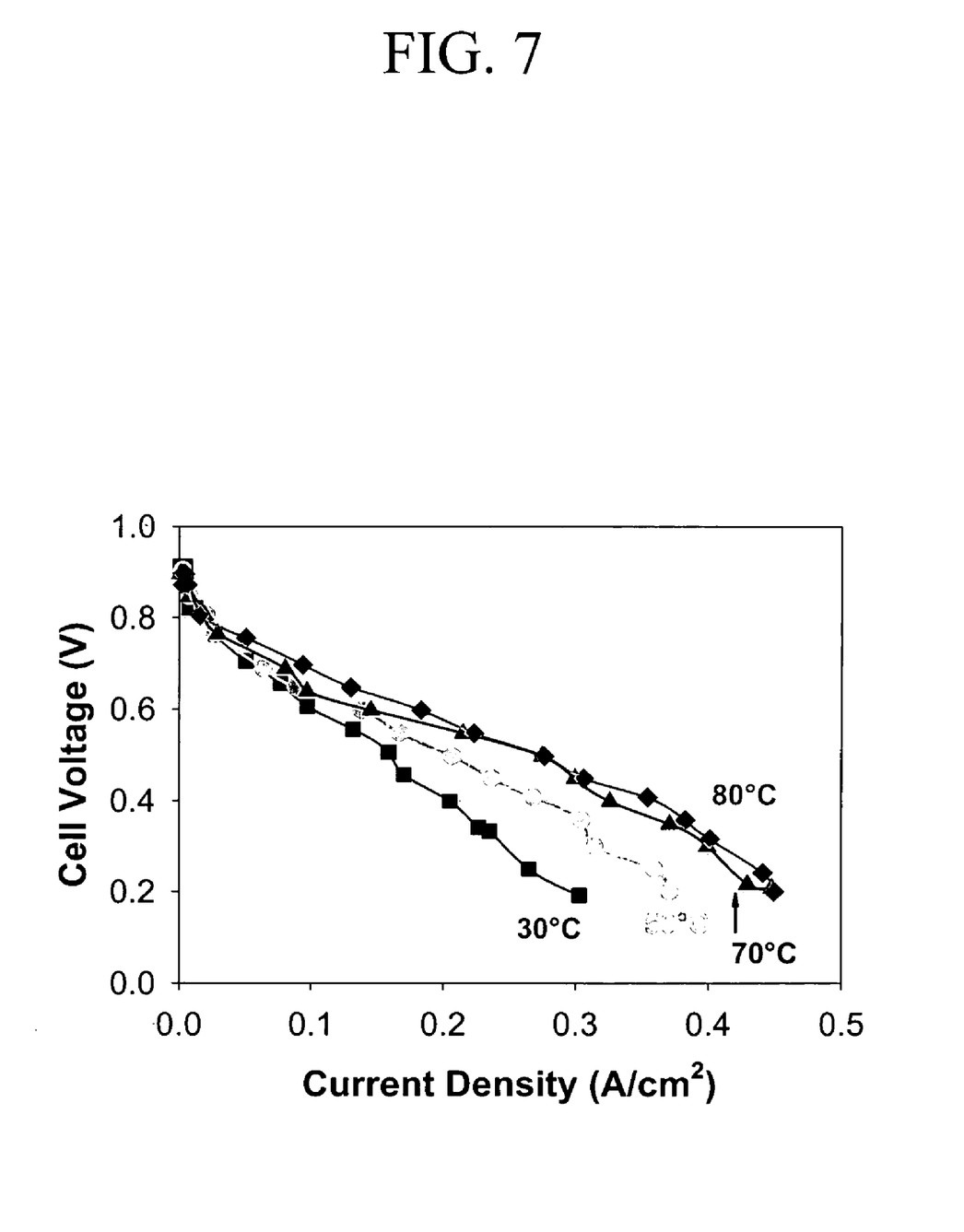
FIG. 7 is a plot of hydrogen-air fuel cell polarization at different cell temperatures obtained for a membrane electrode assembly having a Ru/Se cathode catalyst.

FIG. 7 shows hydrogen-air polarization plots obtained at different temperatures for the MEA having a Ru/Se cathode. Fuel cell performance improves with increasing cell temperature. In addition, the Ru/Se catalyst exhibits high catalytic activity in the hydrogen-air fuel cell that allows the maximum power density to reach ⅓ of that achievable by cells having platinum cathodes.

Figure 8:
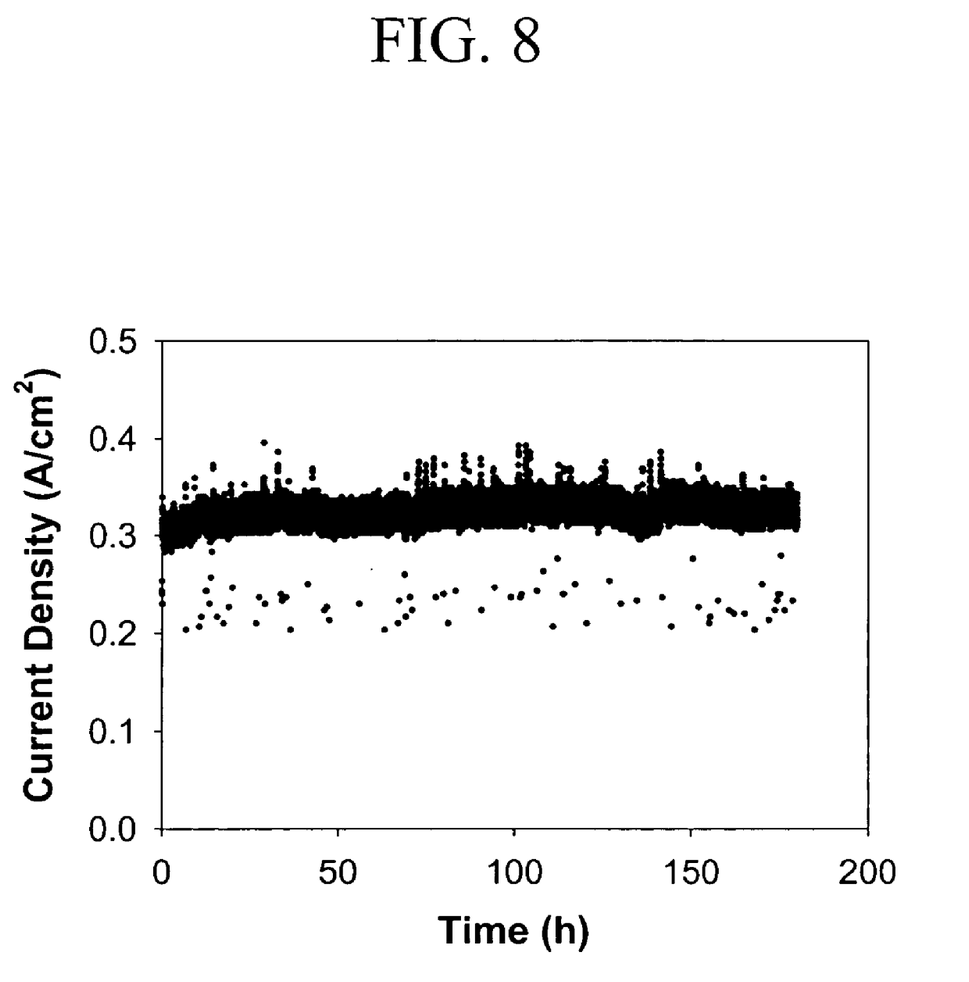
FIG. 8 is a plot of a hydrogen-air fuel cell life test at 70° C. and a constant cell voltage of 0.40 V for a fuel cell having a membrane electrode assembly having an Ru/Se cathode catalyst.

The MEA was life-tested in a hydrogen-air fuel cell at a constant cell voltage of 0.40 V. The current density measured for the fuel cell is plotted as a function of time in FIG. 8. The MEA having a Ru/Se cathode showed no decline in current output after 180 hours of continuous fuel cell operation.

EXAMPLE 7

Direct Methanol Fuel Cell Performance

In DMFC testing, methanol was supplied to the anode at a rate of 1.8 mL/min. Air, humidified at 90° C., was provided to the cathode at ambient pressure (unlike the hydrogen-oxygen experiments previously described above). Methanol was provided at concentrations of 0.5 M, 1.0 M, 5.0 M, and 17 M. The DMFC was tested at 80° C.

Figure 9:
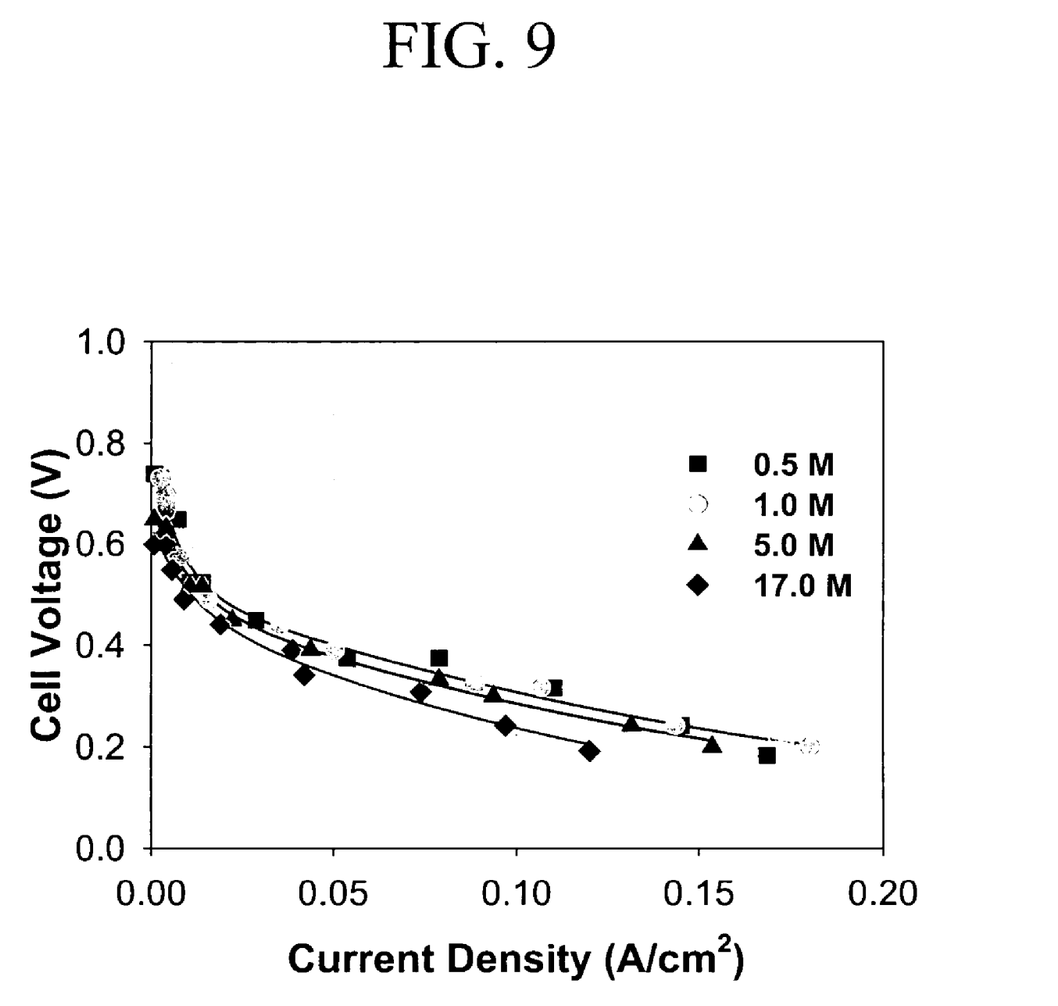
FIG. 9 is a plot of direct methanol fuel cell polarization at 80° C. for different anode concentrations of methanol obtained using a membrane electrode assembly having an Ru/Se cathode catalyst.

DMFC polarization plots obtained with different anode concentrations of methanol at 80° C. are shown in FIG. 9. Although the Ru/Se cathode performance is less than that of a Pt cathode at low methanol concentrations, the Ru/Se cell performance is independent of methanol concentration, and outperforms typical Pt cells at methanol concentrations greater than about 5 M. The Ru/Se cell exhibits slightly lower performance at a methanol concentration of 17 M compared to that observed at other methanol concentrations. This behavior may be attributed to reduced activity of the DMFC anode at this extreme methanol concentration (1:1 methanol-to-water ratio), rather than any methanol intolerance of the Ru/Se cathode.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A membrane electrode assembly, the membrane electrode assembly comprising:
   a. an ionomeric membrane;
   b. an anode disposed on a first surface of the ionomeric membrane; and
   c. a cathode catalyst disposed on a second surface of the ionomeric membrane, the cathode catalyst comprising:
      i. a support comprising at least one transition metal in elemental form capable of reducing oxygen;
      ii. at least one chalcogen in elemental form disposed on at least a portion of a surface of the support; and
      iii. a recast ionomer dispersed throughout the support.

2. The membrane electrode assembly according to claim 1, wherein the at least one transition metal is selected from the group consisting of ruthenium, osmium, rhenium, rhodium, platinum, palladium, cobalt, nickel, chromium, molybdenum, iron, manganese, vanadium, tungsten, and combinations thereof.

3. The membrane electrode assembly according to claim 2, wherein the membrane electrode assembly forms part of a polymer electrolyte fuel cell.

4. The membrane electrode assembly according to claim 1, wherein the cathode catalyst is substantially inert with respect to methanol oxidation.

5. The membrane electrode assembly according to claim 1, wherein the at least one chalcogen forms between about 0.1 monolayer and about 2 mono layers on the surface of the support.

6. The membrane electrode assembly according to claim 1, wherein the at least one chalcogen is selected from the group consisting of sulfur, selenium, and tellurium.

7. The membrane electrode assembly according to claim 1, wherein the recast ionomer is selected from the group consisting of poly(perflourosulphonic acid), sulfonated styrene-ethylene-butylene-styrene, polystyrene-graft-poly(styrene sulfonic acid), poly(vinylidene fluoride)-graft-poly(styrene sulfonic acid), poly(arylene ether), polyphosphazene, derivatives thereof, and combinations thereof.

8. The membrane electrode assembly according to claim 7, wherein the recast ionomer is poly(perflourosulphonic acid).

9. The membrane electrode assembly according to claim 1, wherein the ionomeric membrane is selected from the group consisting of poly(perflourosulphonic acid), sulfonated styrene-ethylene-butylene-styrene, polystyrene-graft-poly(styrene sulfonic acid), poly(vinylidene fluoride)-graft-poly(styrene sulfonic acid), poly(arylene ether), polyphosphazene, derivatives thereof, and combinations thereof.

10. The membrane electrode assembly according to claim 1, further comprising a second diffusion layer, wherein the second diffusion layer is disposed over the cathode catalyst.

11. The membrane electrode assembly according to claim 1, further comprising a first diffusion layer, wherein the first diffusion layer is disposed over the anode catalyst.

12. The membrane electrode assembly according to claim 1, wherein the membrane electrode assembly forms a portion of a fuel cell.

* * * * *